United States Patent
Pierpont

(10) Patent No.: US 8,141,518 B2
(45) Date of Patent: Mar. 27, 2012

(54) ANIMAL SHELTER WITH INTEGRATED STORAGE AND TRAINING SYSTEMS AND METHODS

(76) Inventor: John Pierpont, Orange, CA (US)

( * ) Notice: Subject to any disclaimer, the term of this patent is extended or adjusted under 35 U.S.C. 154(b) by 727 days.

(21) Appl. No.: 12/187,063

(22) Filed: Aug. 6, 2008

(65) Prior Publication Data

US 2010/0031895 A1 Feb. 11, 2010

(51) Int. Cl.
*A01K 31/07* (2006.01)
(52) U.S. Cl. .......................................... 119/473
(58) Field of Classification Search .................. 119/416, 119/452, 453, 455, 472–474, 482, 498, 499
See application file for complete search history.

(56) References Cited

U.S. PATENT DOCUMENTS

| | | | |
|---|---|---|---|
| 275,969 A | 4/1883 | Woodside | |
| 315,925 A | 4/1885 | Evans | |
| 862,659 A * | 8/1907 | Richards | 220/6 |
| 1,329,344 A | 1/1920 | Spreckels | |
| 1,667,998 A | 5/1928 | Woodworth | |
| 2,787,028 A * | 4/1957 | Webb | 52/198 |
| 3,791,347 A | 2/1974 | Lovell | |
| 3,875,902 A | 4/1975 | Gasper | |
| 5,121,710 A * | 6/1992 | Gonzalez | 119/498 |
| 5,148,768 A | 9/1992 | Hinton | |
| D330,274 S | 10/1992 | Smith et al. | |
| D335,002 S | 4/1993 | Read et al. | |
| 5,216,977 A | 6/1993 | Allen, Jr. | |
| D346,676 S | 5/1994 | Hopper, Jr. et al. | |
| 5,349,924 A | 9/1994 | Hopper, Jr. | |
| 5,382,313 A | 1/1995 | Eminger | |
| 5,452,681 A * | 9/1995 | Ho | 119/498 |
| 5,524,573 A * | 6/1996 | Hart | 119/489 |
| 5,551,371 A | 9/1996 | Markey et al. | |
| 5,937,792 A | 8/1999 | Madrid | |
| 5,964,190 A | 10/1999 | Willinger et al. | |
| 6,352,076 B1 | 3/2002 | French | |
| 6,484,672 B1 | 11/2002 | Versaw | |
| D467,040 S | 12/2002 | Bunting | |
| 6,490,995 B2 | 12/2002 | Greene, Jr. | |
| 6,732,676 B1 | 5/2004 | Smith | |
| 6,832,580 B2 * | 12/2004 | Marchioro | 119/452 |
| 6,840,193 B2 | 1/2005 | Kost et al. | |
| 6,971,333 B1 | 12/2005 | Hearrell | |
| 7,665,420 B2 * | 2/2010 | Plante et al. | 119/463 |
| 7,827,940 B2 * | 11/2010 | Silverman | 119/474 |
| 2004/0139922 A1 | 7/2004 | Kost et al. | |
| 2006/0124073 A1 * | 6/2006 | Croft et al. | 119/482 |
| 2008/0245313 A1 * | 10/2008 | Jakubowski et al. | 119/497 |
| 2009/0159013 A1 * | 6/2009 | Anderson et al. | 119/482 |

FOREIGN PATENT DOCUMENTS

| FR | 2584567 | 1/1987 |
|---|---|---|
| GB | 6935 | 0/1911 |

* cited by examiner

*Primary Examiner* — Kristen Hayes
(74) *Attorney, Agent, or Firm* — Haynes and Boone, LLP

(57) ABSTRACT

A shelter for an animal comprises a base member having a plurality of recessed channels formed in an upper surface thereof and adjacent to a perimeter thereof, a plurality of wall members coupled with the recessed channels in the base member so as to form an enclosure that defines an interior space, and a roof member pivotally attached to at least one of the wall members so as to move between an open and closed configuration. The shelter comprises a removable storage member positioned between the base member and the roof member so as to vertically separate the interior space into an interior storage compartment and an interior residential compartment for the animal. The shelter comprises a movable partition member positioned between at least two of the wall members and adapted to vary the dimension of the interior residential compartment.

20 Claims, 14 Drawing Sheets

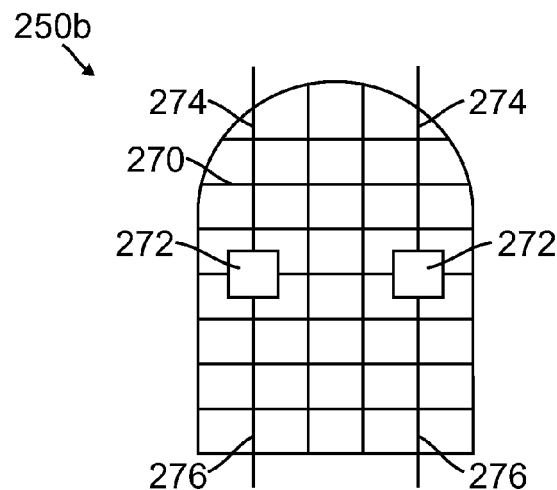
FIG. 2C
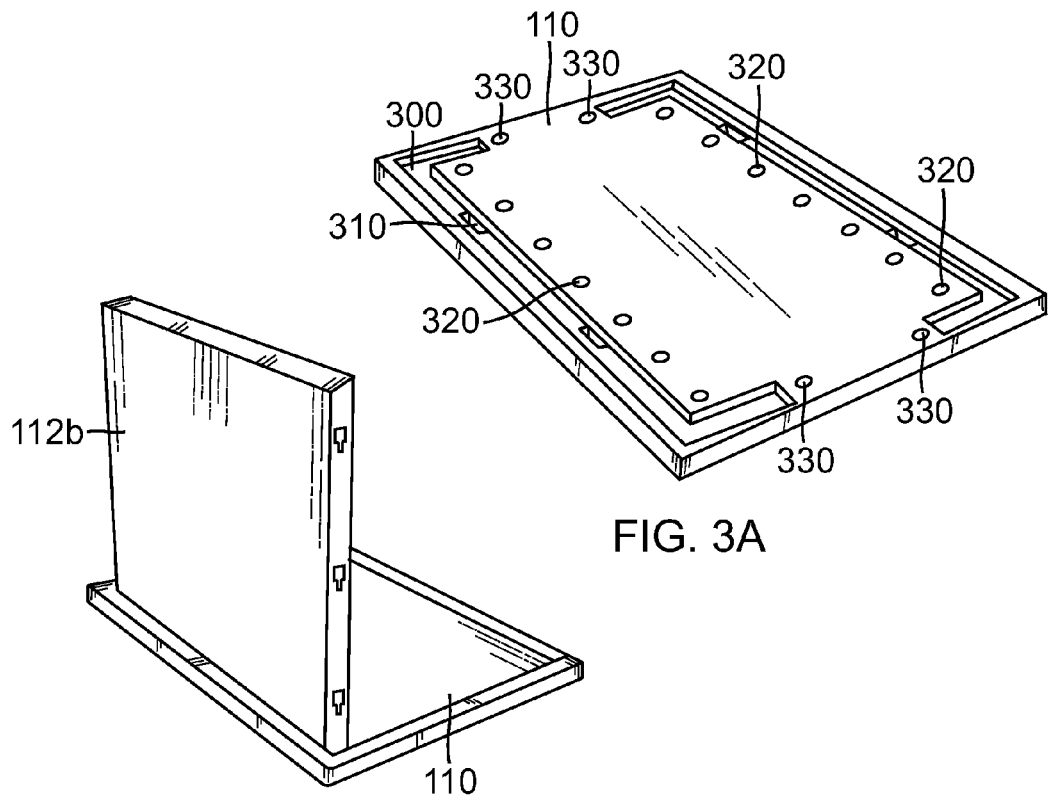
FIG. 3A
FIG. 3B

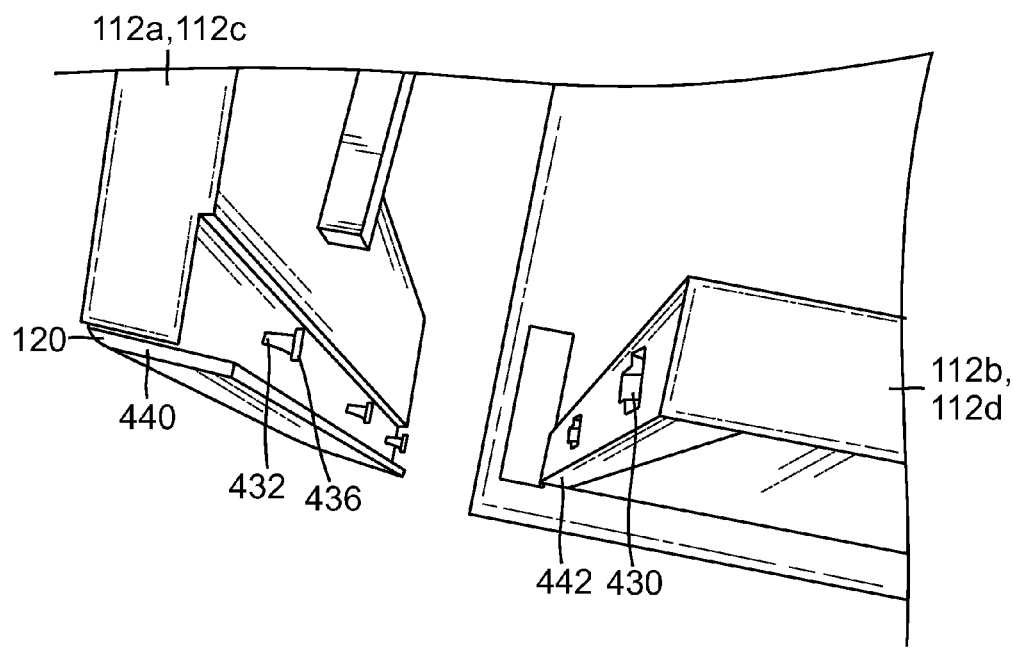
FIG. 4A
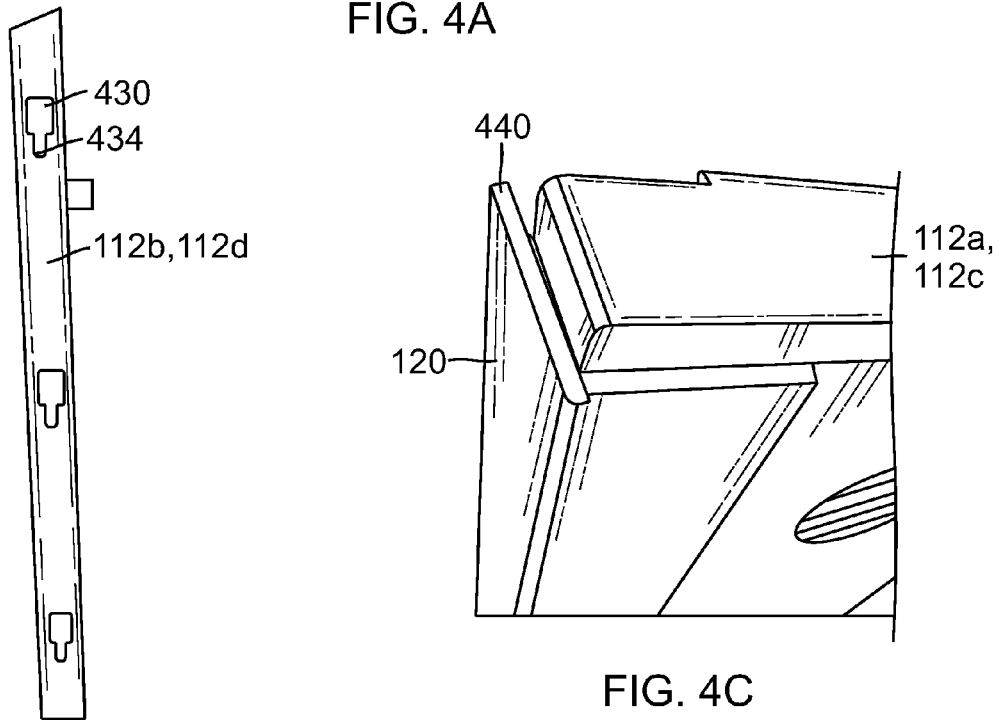
FIG. 4B
FIG. 4C

ANIMAL SHELTER WITH INTEGRATED STORAGE AND TRAINING SYSTEMS AND METHODS

TECHNICAL FIELD

The present invention relates generally to animal shelters and, more particularly, to an animal shelter with integrated storage and training systems and methods.

BACKGROUND

Generally, animal shelters are utilized as residential enclosures for animals, such as household pets. Conventional animal shelters include a floor, multiple walls, and a roof assembled in some manner to define an interior space, and at least one of the walls includes an opening for access to the interior space. Typically, conventional animal shelters are manufactured in various sizes and shapes to accommodate various sized animals.

Conventional animal shelters are typically not adaptable to an animal as the animal grows to adulthood. As such, to properly train an animal, a consumer may purchase more than one animal shelter as the animal grows larger, which can be expensive. If the consumer doesn't purchase another primary shelter after training the young animal, the typical training crate doesn't allow for adequate shelter in most cases for an adult. Also, conventional animal shelters are difficult to assemble and clean, which can be time consuming. Secure, ample storage for the increasing number of pet products is missing in the marketplace.

Therefore, there is a need for an animal shelter that can accommodate more than one size of animal. To promote good crate training techniques, the animal shelter should be adaptable to the size of the animal during growth.

SUMMARY

In accordance with one or more embodiments of the present disclosure, a shelter for an animal comprises a base member having a plurality of recessed channels formed in an upper surface thereof and adjacent to a perimeter thereof, a plurality of wall members coupled with the recessed channels in the base member so as to form an enclosure that defines an interior space, and a roof member pivotally attached to at least one of the wall members so as to move between an open and closed configuration. In one aspect, the shelter comprises a removable storage member positioned between the base member and the roof member so as to vertically separate the interior space into an interior storage compartment and an interior residential compartment for the animal. In another aspect, the shelter comprises a movable partition member (e.g., a training partition member) positioned between at least two of the wall members and adapted to vary the dimension of the interior residential compartment. In yet another aspect, the movable partition member may be removed completely to maximize the interior residential compartment.

In accordance with one or more embodiments of the present disclosure, a system for sheltering a plurality of animals comprises a plurality of shelters coupled together to form a multi-unit configuration. In various implementations, the plurality of shelters are coupled together to have a plurality of separate interior storage compartments and a plurality of separate interior residential compartments with each accessible via an access aperture.

In accordance with one or more embodiments of the present disclosure, a method for assembling a shelter for an animal comprises providing a base member having a plurality of recessed channels formed in an upper surface thereof and adjacent to a perimeter thereof, coupling a plurality of wall members with the recessed channels in the base member so as to form an enclosure that defines an interior space, and pivotally attaching a roof member to at least one of the wall members so as to be movable between an open and closed configuration. In one aspect, the method comprises positioning a removable storage member between the base member and the roof member so as to vertically separate the interior space into an interior storage compartment and an interior residential compartment for the animal. In another aspect, the method comprises positioning a movable partition member between at least two of the wall members so as to vary the dimension of the interior residential compartment.

The scope of the invention is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 2B-2C show perspective views of various removable door members of the animal shelter, in accordance with one or more embodiments of the present disclosure.

FIGS. 3A-3H show various perspective views of a method for assembling the animal shelter, in accordance with one or more embodiments of the present disclosure.

FIGS. 4A-4C show various perspective views of wall joining components of the animal shelter, in accordance with one or more embodiments of the present disclosure.

Embodiments of the present disclosure and their advantages are best understood by referring to the detailed description that follows. It should be appreciated that like reference numerals are used to identify like elements illustrated in one or more of the figures.

DETAILED DESCRIPTION

In accordance with one or more embodiments of the present disclosure, systems and methods described herein provide a modular animal shelter with integrated storage and training systems. The modular animal shelter provides a residential enclosure, effective crate training, and convenient storage in an easy to assemble, attractive, easy to maintain, modular structure. In one implementation, the modular animal shelter includes an adjustable partition within the interior space to assist with crate training. In another implementation, the modular animal shelter includes a pivoting roof that provides convenient and easy access to a storage compartment separate from the interior residential space.

Figure 1A:
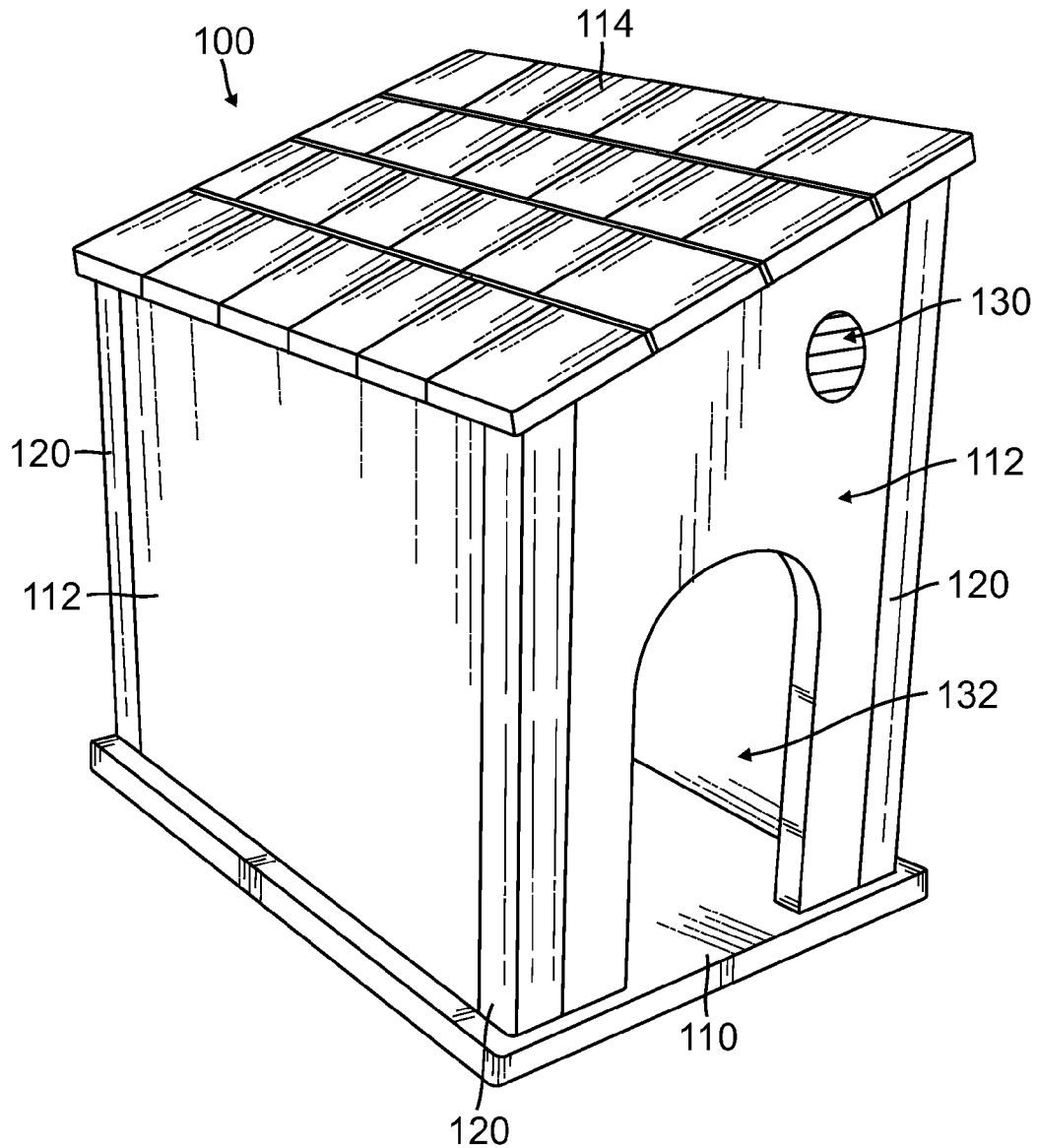
FIG. 1A shows a perspective view of an animal shelter, in accordance with an embodiment of the present disclosure.

FIG. 1A shows one embodiment of an animal shelter 100 having a base member 110, a plurality of wall members 112, and a roof member 114. In various implementations, the animal shelter 100 comprises a modular structure that is adapted to be assembled, unassembled and reassembled in a reliable and convenient manner. In one implementation, the animal shelter 100 comprises a dog house. However, in various implementations, it should be appreciated that the animal shelter 100 may comprise a structure adapted to house one or more different types of animals, such as house pets, farm animals, etc., without departing from the scope of the present disclosure.

The base member 110, in one embodiment, is adapted to receive the wall members 112 and provide a rigid structure when assembled. The wall members 112, in one embodiment, are joined to the base member 110 via recessed channels 300 and recessed apertures 310, as shown in FIG. 3A. The wall members 112 are joined together at each corner of the animal shelter 100 with a plurality of wall joining components 120, as shown in FIGS. 4A-4C. The wall members 112 are substantially flat and are adapted to enclose and define an interior space of the animal shelter 100 with the base member 110 serving as a floor. The wall members 112 may comprise a hollow interior region that may be filled with water, sand, and/or any other material that provides additional weight and/or insulation to the animal shelter 100 to inhibit shifting or movement when assembled.

In various implementations, the footprint of the base member 110 is flat and rectangular in shape. The base member 110 comprises the one or more recessed channels 300 that allow the vertically aligned wall members 112 to press fit therein to provide rigid structural support for the assembled animal shelter 100. The base member 110 comprises one or more rectangular slots (e.g., recessed apertures 310 of FIG. 3A) formed in a lower surface of the recessed channels 310 to allow for tabs (e.g., support protrusions 450 of FIG. 4D) extending from a lower side surface of the wall members 112 to securely couple into the base member 110 for assembly of the animal shelter 100. The rectangular slots may also serve as a method of drainage for the interior space. In one aspect, the base member 110 comprises an upper surface with a patterned recessed contour comprising, for example, a crisscross lattice shape to provide increased strength while reducing material costs. In another aspect, the base member 110 comprises an outside upper perimeter edge that is adapted to be rounded and/or angled (e.g., chamfered) so as to not create discomfort for an animal overlying base member 110.

Figure 1B:
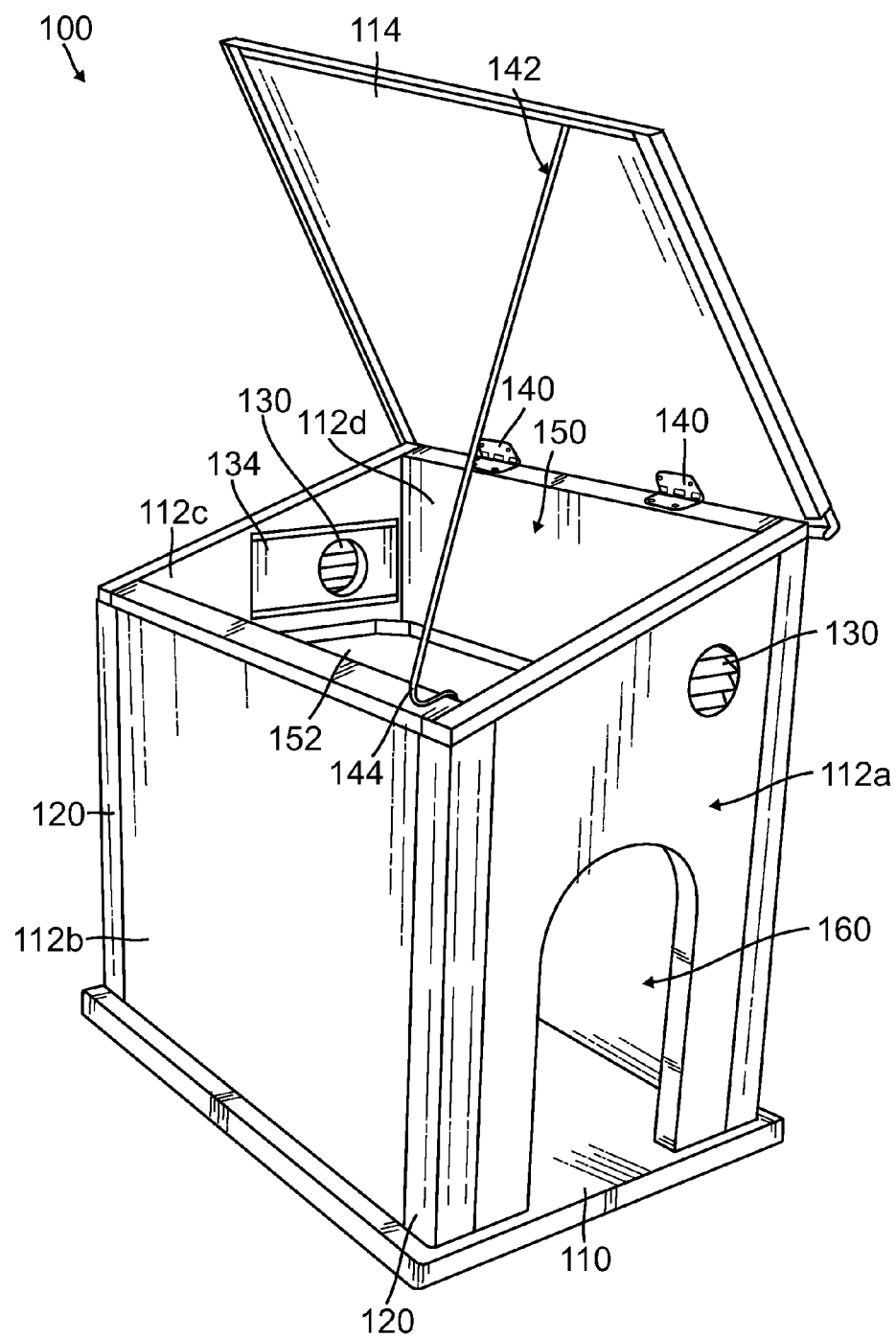
FIG. 1B shows a perspective view of the animal shelter with an open roof, in accordance with an embodiment of the present disclosure.

The roof member 114, in one embodiment, may be joined to at least one wall member 112 via one or more hinge components 140, as shown in FIG. 1B. In one aspect, the hinge components 140 allow the roof member 114 to pivot away from the wall members 112 into the open configuration, as shown in FIG. 1B. The roof member 114 is substantially flat and rectangular in shape and is adapted to overlie and cover the interior space of the animal shelter 100 defined by the assembly of the base member 110 and the wall members 112.

The base member 110, the wall members 112, and the roof member 114 may be formed of different types of materials, such as plastic, resin, metal, wood, glass, Plexiglas, and various other types of generally known materials. In one aspect, the materials utilized to form the base member 110, the wall members 112, and the roof member 114 are Ultra-Violet (UV) protected to reduce deterioration and wear when exposed to an external environment.

The base member 110, the wall members 112, and the roof member 114 may comprise different types of surface textures, including smooth, rough, corrugated, etc., and various other types of generally known surface textures. For example, the surfaces of the base member 110 may be formed, molded, stamped or carved with non-slip features, such as rough surface textures and various other types of generally known non-slip contours. In another example, the surfaces of the wall members 112 may be formed, molded, stamped or carved with contoured features, such as wood siding, geometric shapes, various surface textures, and various other types of generally known aesthetic contours. In one aspect, the interior surface of each of the wall members 112 may be textured with a smooth surface to provide comfort to animal residing in the animal shelter 100 as well as ease of cleaning. In still another example, the surfaces of the roof member 114 may be formed, molded, stamped or carved with contoured features, such as shingles and various other types of generally known roofing contours.

Figure 2A:
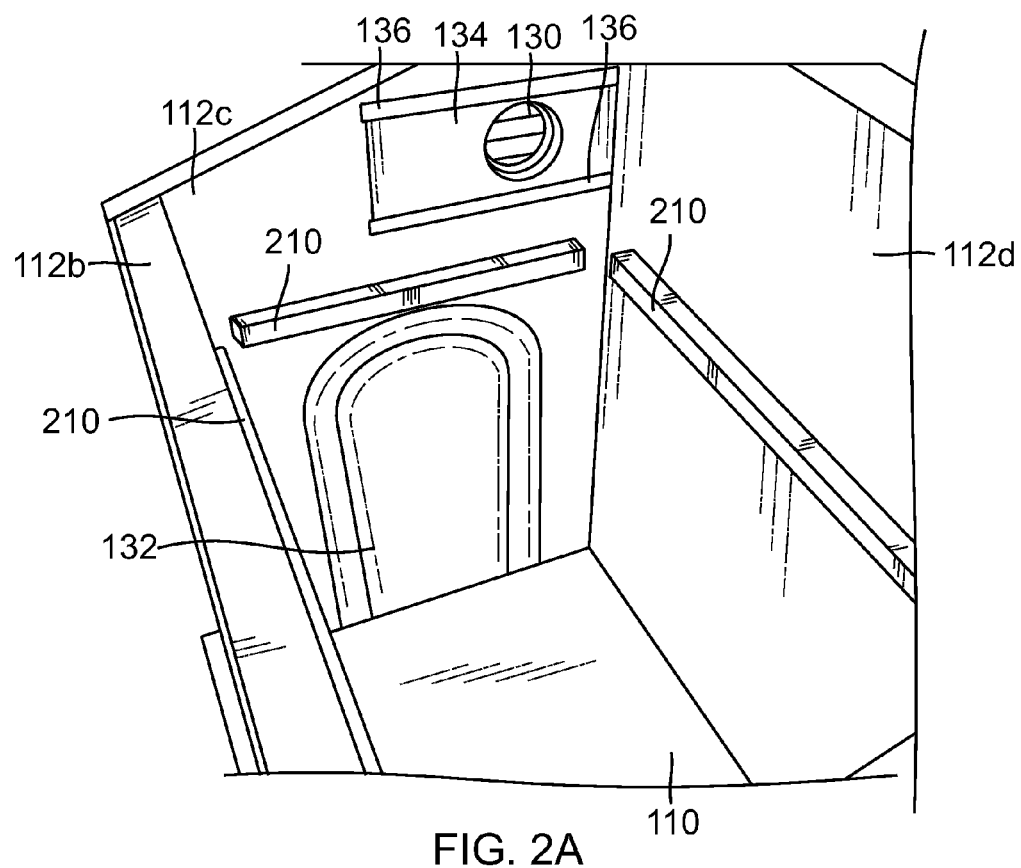
FIG. 2A shows a perspective view of an interior region of the animal shelter, in accordance with an embodiment of the present disclosure.

In various implementations, a vent aperture 130 may be formed in at least one of the wall members 112, which allows air to circulate in and out of the animal shelter 100. In one aspect, the vent aperture 130 may comprise a movable vent cover 134, as shown in FIGS. 1B and 2A, that may be adapted to slide along vent channels 136 to cover and uncover the vent aperture 130.

In various implementations, an access aperture 132 may be formed in at least one of the wall members 112, which allows an animal to enter into and exit from the interior region of the animal shelter 100. The access aperture 132 may be formed in different sizes, widths and shapes to accommodate different types of animals. Hence, the contour of the access aperture 132 may vary depending on the type of animal using the animal shelter 100.

FIG. 1B shows one embodiment of the animal shelter 100 with the roof member 114 in the open configuration. As shown in FIG. 1B, the roof member 114 may be joined to the fourth wall member 112d via one or more hinge components 140. In one aspect, the hinge components 140 allow the roof member 114 to pivot away from and above the wall members 112 into the open configuration. In one implementation, the roof member 114 is substantially flat and rectangular in shape and is adapted to overlie and cover the interior space of the animal shelter 100 defined by the assembly of the base member 110 and the wall members 112.

Figure 1C:
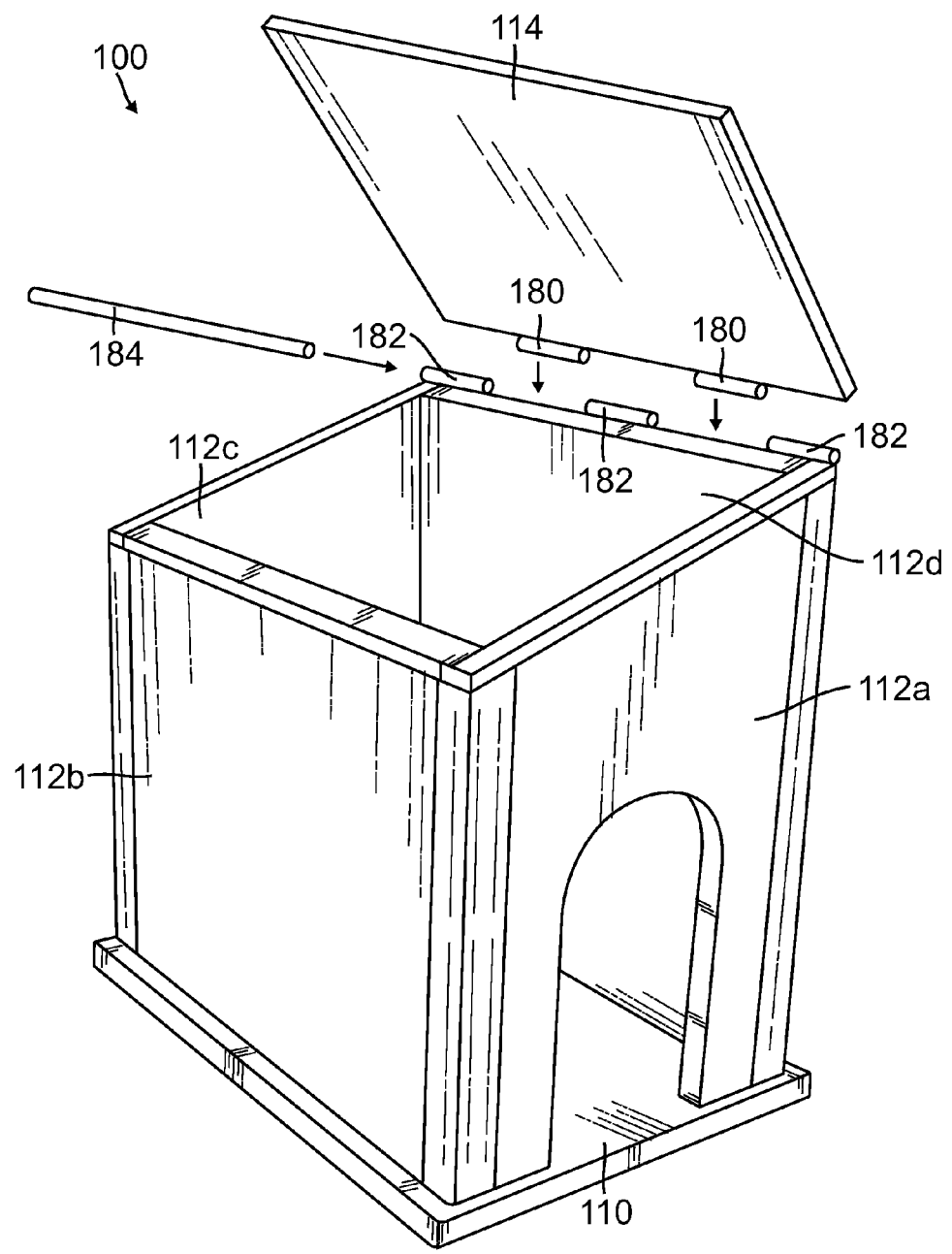
FIG. 1C shows a perspective view of the animal shelter with an open and detached roof, in accordance with an embodiment of the present disclosure.

In an alternate embodiment, as shown in FIG. 1C, the roof member 114 may comprise one or more integrated hinge tubes 180 attached to a lower back edge thereof that are adapted to communicate with one or more integrated hinge tubes 182 attached to an upper side edge of at least one of the wall members, such as the fourth wall member 112b. As shown in FIG. 1C, a coupling rod 184 may be utilized to secure the roof member 114 to the fourth wall member 112d via the hinge tubes 180, 182 by sliding the coupling rod 184 into the hinge tubes 180, 182 when aligned to receive the coupling rod 184. In one aspect, one or more hinge pins (not shown) may be utilized instead of the coupling rod 184 to secure the roof member 114 to the fourth wall member 112*d* via the hinge tubes 180, 182.

Figure 5A:
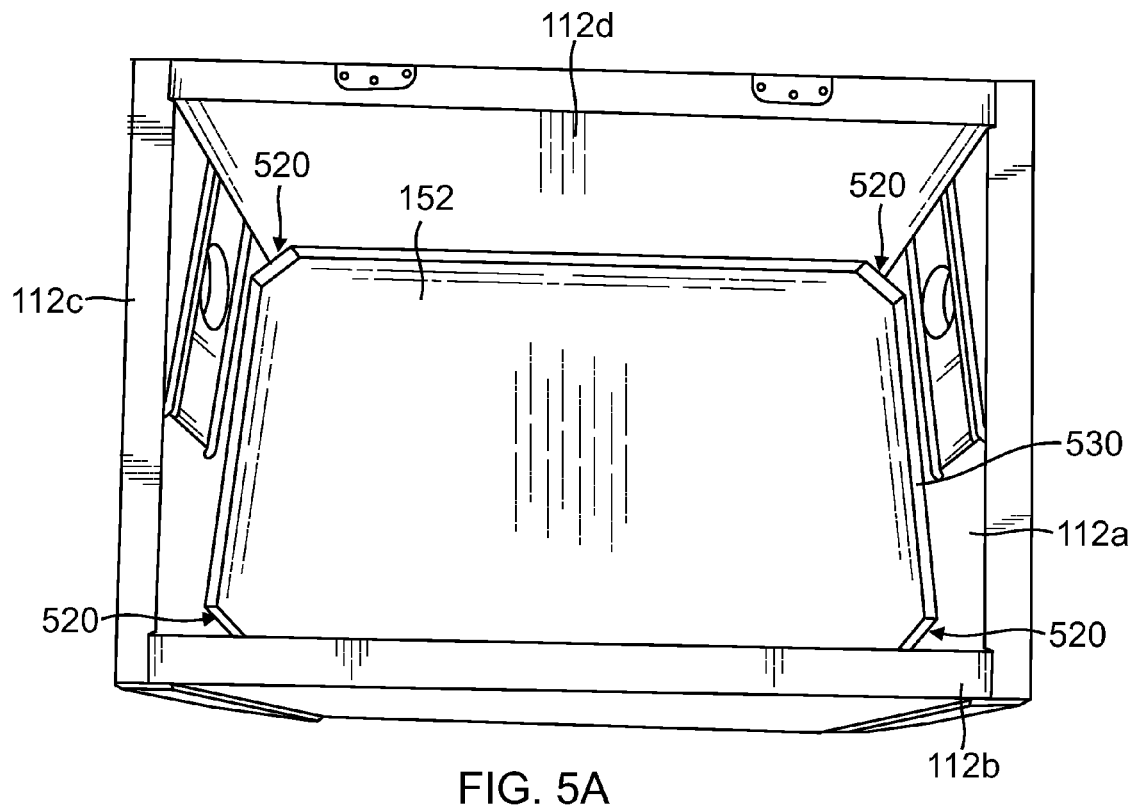
FIGS. 5A-5B show various perspective views of the removable interior storage member of the animal shelter, in accordance with one or more embodiments of the present disclosure.
Figure 5B:
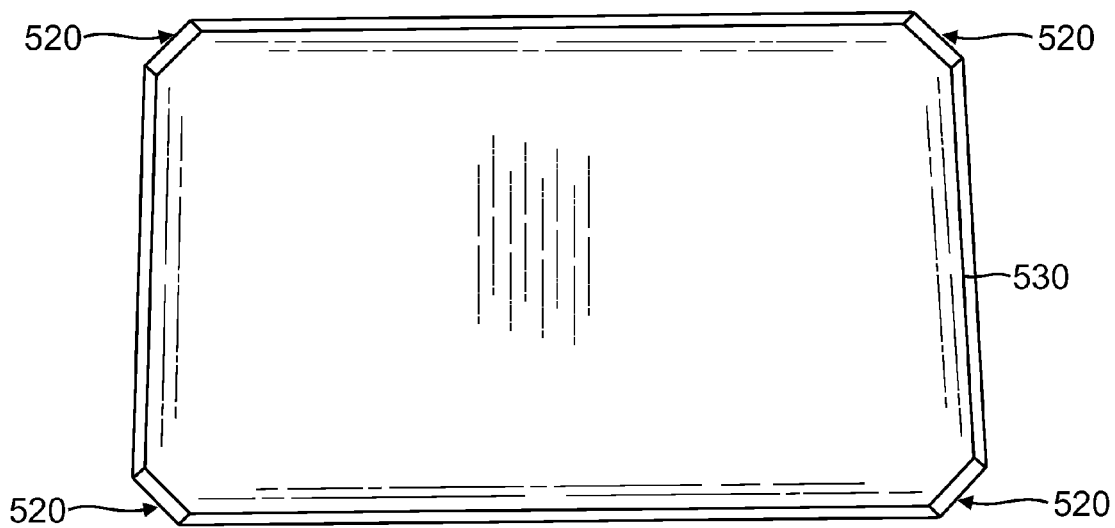

As shown in FIG. 1B, the animal shelter 100 comprises an interior storage compartment 150 with a removable interior storage member 152. In one aspect, the removable interior storage member 152 serves as a storage shelf that is adapted to support different types of items for storage, such as animal food, animal cleaning materials, and various other types of animal care items. In one implementation, the interior storage member 152 is substantially flat and rectangular in shape with chamfered corners 520, as shown in FIGS. 5A and 5B. The removable interior storage member 152 separates the interior space within the animal shelter 100 into an upper interior region and a lower interior region. The upper interior region comprises the interior storage compartment 150 that may be utilized as a storage space with the interior storage member 152 serving as a storage shelf. The lower interior region comprises an interior residence compartment 160 that may be utilized as an animal residence space with the interior storage member 152 serving as a ceiling. In one aspect, the removable interior storage member 152 comprises an integrated raised ridge 530, as shown in FIGS. 5A and 5B, along the perimeter to inhibit fluids or other items from falling, leaking or otherwise entering the shelter area (e.g., interior residence compartment 160) provided below.

In one embodiment, the roof member 114 may be held in the open configuration with a retaining member 142, such as a rigid rod or pipe interposed between at least one wall member 112 and the roof member 114, as shown in FIG. 1B. In an alternate embodiment, the one or more hinge components 140 may include a spring component (not shown) that biases the roof member 114 in the open configuration without the need for the retaining member 142. At least one wall member 112 may comprise at least one dimple 144 formed on upper side surface thereof to support the retaining member 142 when in the open configuration. The retaining member 142 may be positioned on a left or right side position. The roof member 114 may comprise one or more integrated attachments (not shown) to securely couple the retaining member 142 thereto. In one aspect, another attachment (not shown) may be adapted to tether the retaining member 114 to the roof member 114 when not in use.

As shown FIG. 1B, the wall members 112 comprise a first wall member 112*a*, a second wall member 112*b*, a third wall member 112*c*, and a fourth wall member 112*d*. As described in greater detail herein, the wall members 112*a*, 112*b*, 112*c*, 112*d* are coupled to the base member 110 in a modular manner for ease of assembly.

The first wall member 112*a* comprises a first sidewall having the access aperture 132 formed therein. The first sidewall 112*a* comprises a semi-rectangular, trapezoidal shape, wherein two vertical sides are parallel, a lower horizontal side adjacent the base member 110 is perpendicular to the two vertical sides, and an upper side adjacent the roof member 114 has an angular, upward pitch from the second wall member 112*b* to the fourth wall member 112*d*, which is at least taller than the second wall member 112*b*. The first wall member 112*a* is coupled to the base member 110 in a perpendicular manner. The first wall member 112*a* may comprise the vent aperture 130 formed in an upper region above the access aperture 132.

The second wall member 112*b* comprises a second sidewall and is positioned perpendicular to the first wall member 112*a*. The second wall member 112*b* is substantially flat and rectangular in shape. The second wall member 112*b* is coupled to the base member 110 in a perpendicular manner.

The third wall member 112*c* comprises a third sidewall and is positioned perpendicular to the second wall member 112*b* and parallel to the first wall member 112*a*. The third wall member 112*c* may comprise another access aperture 132 formed therein. Similar to the first wall member 112*a*, the third wall member 112*c* comprises a semi-rectangular, trapezoidal shape, wherein two vertical sides are parallel, a lower horizontal side adjacent the base member 110 is perpendicular to the two vertical sides, and an upper side adjacent the roof member 114 has an angular, upward pitch from the second wall member 112*b* to the fourth wall member 112*d*. The third wall member 112*c* is coupled to the base member 110 in a perpendicular manner.

The fourth wall member 112*d* comprises a fourth sidewall and is positioned perpendicular to the first and third wall members 112*a*, 112*c* and parallel to the second wall member 112*b*. The fourth wall member 112*d* is substantially flat and rectangular in shape and is at least taller than the second wall member 112*b*. The fourth wall member 112*d* is coupled to the base member 110 in a perpendicular manner.

In various implementations, at least two of the wall members 112 (e.g., first and third wall members 112*a*, 112*c*) comprise an integrated vertical corner member (e.g., wall joining members 120), which may serve as a decorative design feature as well as a key structural design component. The wall joining members 120 may comprise a smooth textured surface for aesthetic contrast to the textured surfaces of the wall members 112. In various aspects, the structural assembly and design of the base member 110 and the wall members 112 allows for convenient assembly and installation as well as reliable structural rigidity.

It should be appreciated that any or all of the wall members 112*a*, 112*b*, 112*c*, 112*d* and/or the roof member 114 may comprise one or more vent apertures 130 formed therein, without departing from the scope of the present disclosure. Further scope and function related to the vent aperture 130 is described in greater detail herein.

FIG. 2A shows one embodiment of the interior region of the animal shelter 100 enclosed by the plurality of wall members 112. As shown in FIG. 2A, each of the wall members 112*a*, 112*b*, 112*c*, 112*d* comprise at least one support member 210 (e.g., support ridge) that is attached thereto or formed as part thereof and positioned parallel to the base member 110. The support members 210 are adapted to receive and support the removable interior storage member 152. The removable interior storage member 152 separates the interior space within the animal shelter 100 into an upper interior region (i.e., interior storage compartment 150) and a lower interior region (i.e., interior residence compartment 160).

Figure 2B:
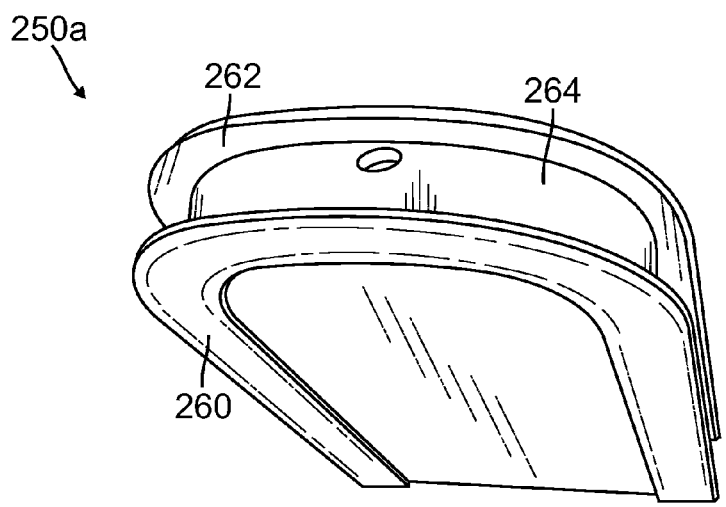

FIG. 2B shows one embodiment of a removable door member 250 (referred to herein for various embodiments as door member 250*a* or 250*b*) of the animal shelter 100 for positioning in the access aperture 132. The door member 250*a* comprises a first panel 260, a second panel 262, and a recessed channel 264, which may be integrated into a single structure for the door member 250*a*. In one implementation, the access aperture 132 of the first wall member 112*a*, as formed therein, is adapted to receive the recessed channel 264 of the door member 250*a* in manner such that the first and second panels 260, 262 overlap the inside and outside of the first wall member 112*a*, respectively. In various aspects, this allows the door member 250*a* to be coupled to the first wall member 112*a* is a secure manner and also be removed from the first wall member 112*a* to provide access to the interior of the animal shelter 100.

In one implementation, the removable door member 250*a* may comprise a rigid, solid structure having integrated first and second panels 260, 262 with the recessed channel 264 formed therebetween. In another implementation, the removable door member 250a may comprise a flexible material (e.g., mesh, clear plastic, vinyl, etc.) that may be utilized in the access aperture 132 of the first and/or third wall member 112a, 112c and open from any direction (e.g., hinged from the top or at least from one of the sides).

In still another implementation, as shown in FIG. 2C, the removable door member 250b may comprise a grate or mesh type structure 270 that serves as a training door. The grate or mesh type structure 270 may comprise one or more spring biased clip mechanisms 274 that actuate one or more coupling rods 274, 276 to allow the door member 250b to be coupled to and removed from the access aperture 132 of the animal shelter 100. One or more first coupling rods 274 are adapted to couple with door receiving holes formed in an upper portion (e.g., archway) of the access aperture 132, and one or more second coupling rods 276 are adapted to couple with door receiving holes formed in a portion of the base member 110 adjacent a lower portion of the access aperture 132. In one implementation, the grate or mesh type structure 270 of the removable door member 250b may serve as a training door to assist with crate training an animal residing in the animal shelter 100.

In one aspect, the removable door member 250a may be referred to as a sleeve structure (e.g., having the recessed perimeter edge channel 264) for convenient removable and installation in the access aperture 132 of the first and/or third wall members 112a, 112c. In another aspect, the removable door member 250 (e.g., 250a or 250b) may comprise a flexible mesh door that is hinged to open either from the top, the left or the right side of the access aperture (e.g., archway entrance).

Figure 3C:
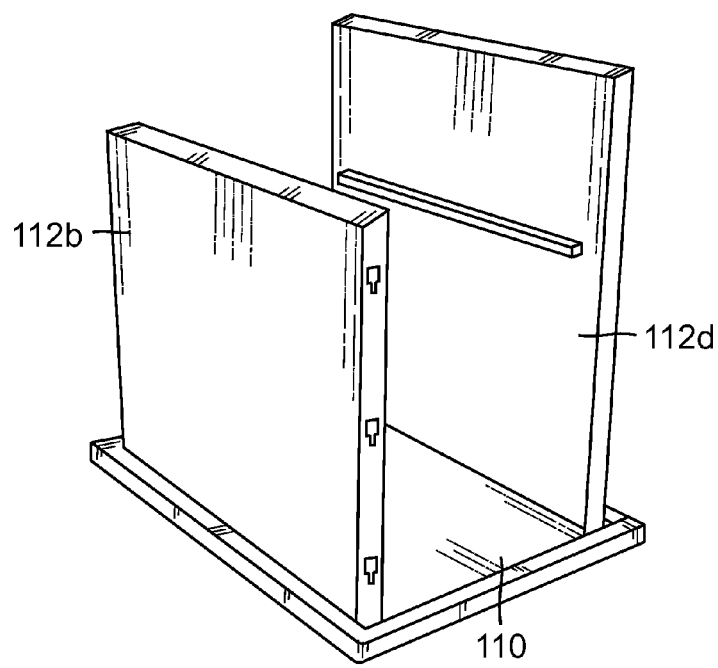

FIGS. 3A-3H show a method for assembling the animal shelter 100, in accordance with one or more embodiments of the present disclosure. In particular, FIG. 3A shows one embodiment of assembling the animal shelter 100 by positioning the base member 110 on flat surface for assembly.

Figure 4D:
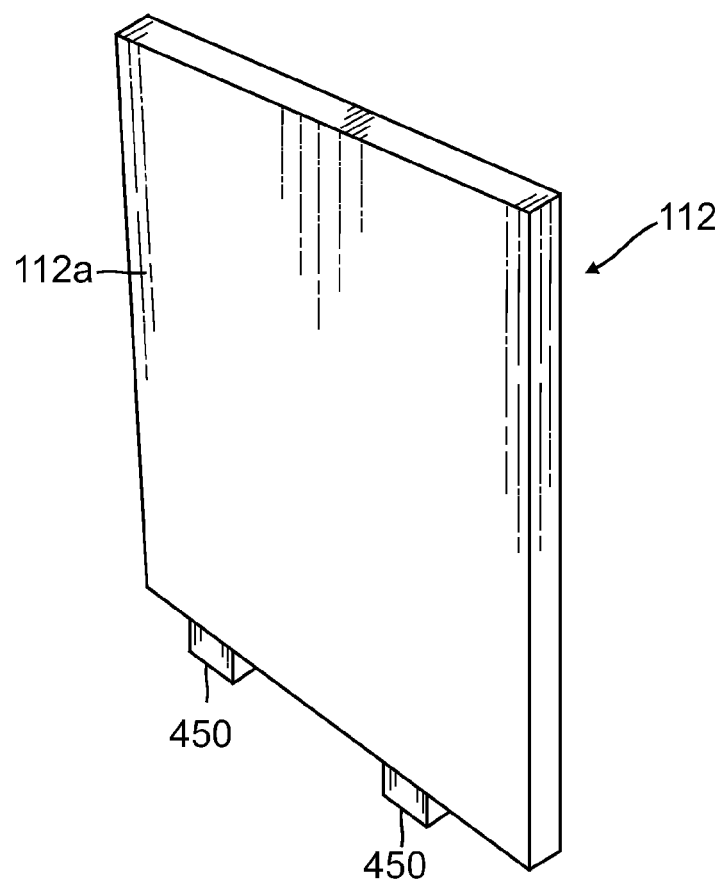
FIG. 4D shows a perspective view of a wall member of the animal shelter having support protrusions that extend from a lower side thereof, in accordance with one or more embodiments of the present disclosure.

As shown in FIG. 3A, the base member 110 comprises a plurality of recessed channels 300 and recessed apertures 310 formed in the recessed channels in a manner so as to receive the wall members 112. In various implementations, the recessed channels 300 comprise a width large enough to receive the thickness of the wall members 112 therein so that the wall members 112 may be slid into the recessed channels 300. One or more of the wall members 112 (e.g., the second wall member 112b, as shown in FIG. 4D) comprise support protrusions 450 that extend from a lower side of each wall member 112 so as to slide into the recessed apertures 310 of the base member 110. As such, in one implementation, the recessed apertures 310 comprise a contoured dimension large enough to receive the contoured shape of the support protrusions 450 therein so that the wall members 112 may be slid into the recessed apertures 310 and the recessed channels 300 in a simultaneous manner.

Figure 6A:
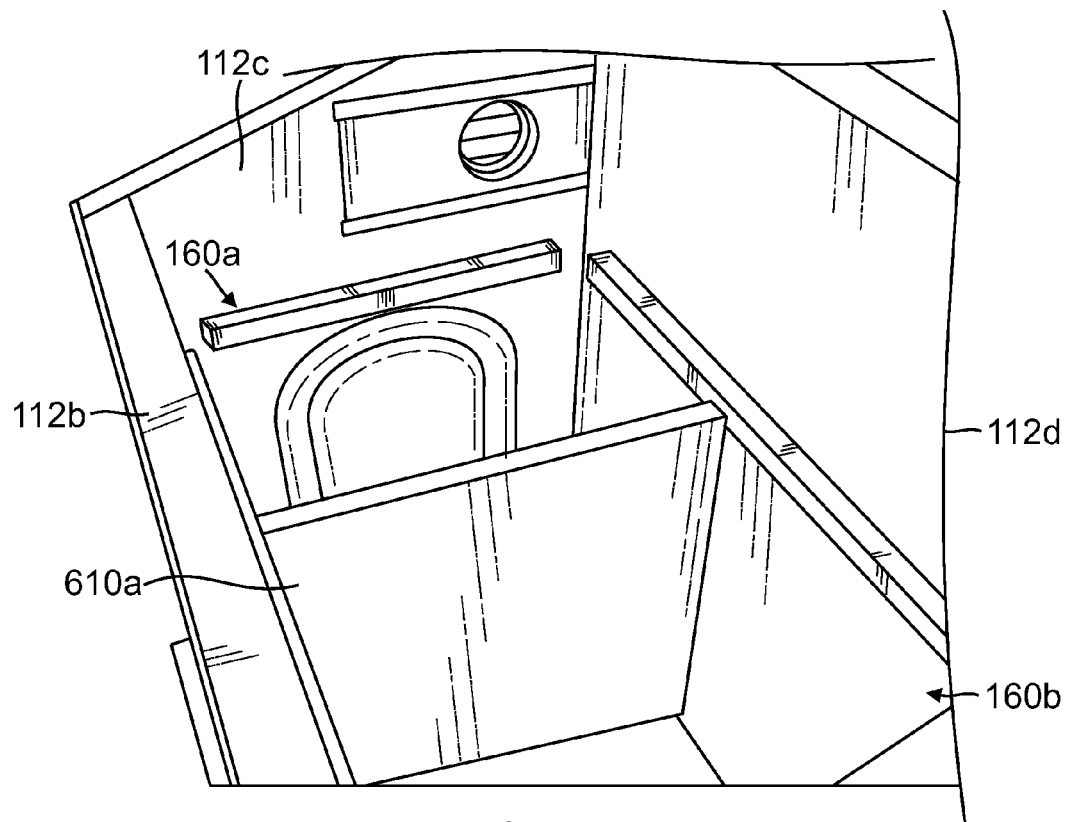
FIGS. 6A-6B show perspective views of various movable interior partitions of the animal shelter, in accordance with one or more embodiments of the present disclosure.
Figure 6B:
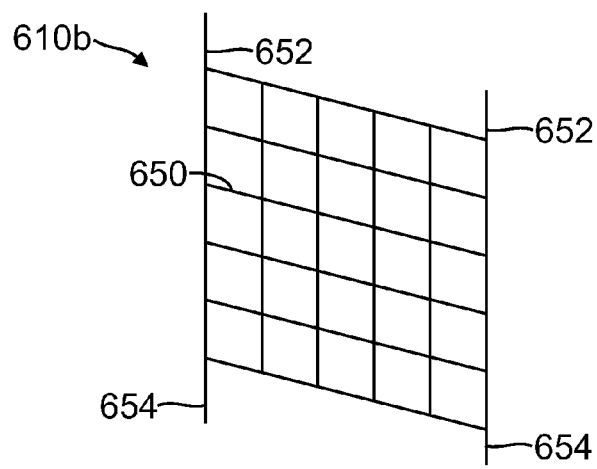

In one embodiment, as shown in FIG. 3A, the base member 110 comprises one or more partition receiving holes 320 that are recessed in an upper surface of the base member 110. In one implementation, the partition receiving holes 320 are adapted to receive a portion of an interior partition wall member 610 (e.g., a training partition member, also referred to herein for various embodiments as partition wall member 610a or 610b), as shown in FIGS. 6A-6B. In another implementation, each of the wall members 112 may also have partition receiving holes (not shown) formed on an interior surface thereof so as to receive a portion of the partition wall member 610a, 610b in a similar manner as with the base member 110.

In one implementation, the partition wall member 610a, 610b may be attached to the base member 110 and/or the wall members 112 so as to divide the interior space (i.e., interior residence compartment 160) into multiple interior residence compartments or at least reduce the dimensional size of the interior space within the animal shelter 100. In another implementation, the partition wall member 610a, 610b is removable from the interior region of the animal shelter 100 so as to increase the dimensional size of the interior space within the animal shelter 100. In one implementation, the partition wall member 610a, 610b may be referred to as training partition member, without departing from the scope of the present disclosure.

In various implementations, the partition wall member 610a, 610b may be incrementally moved along the length of the base member 110 between a plurality of partition receiving holes 320, as shown in FIG. 3A, so as to incrementally lengthen or shorten the dimensional size of the interior space within the animal shelter 100 to thereby accommodate various sizes of animals. In one specific implementation, this feature may be utilized to crate train an animal within the animal shelter 100 as the animal grows from youth to adulthood.

In one embodiment, as shown in FIG. 3A, the base member 110 comprises one or more door receiving holes 330 that are recessed in an upper surface of the base member 110 for coupling the removable door member 250b thereto. In one implementation, the door receiving holes 330 are adapted to receive the one or more second coupling rods 276 of the grate or mesh type structure 270 of the removable door member 250b (e.g., a training door member), as shown in FIG. 2C. In another implementation, the access apertures 132 of the first and/or third wall members 112a, 112c may also have door receiving holes formed on an interior surface (e.g., archway) thereof so as to receive the one or more first coupling rods 274 of the removable door member 250b in a similar manner as with the base member 110.

FIG. 3B shows one embodiment of assembling the animal shelter 100 by coupling the second wall member 112b to the base member 110. The second wall member 112b is joined to the base member 110 via the recessed channel 300 and recessed aperture 310.

FIG. 3C shows one embodiment of assembling the animal shelter 100 by coupling the fourth wall member 112d to the base member 110. The fourth wall member 112d is joined to the base member 110 via the recessed channel 300 and recessed aperture 310. In one aspect, as shown in FIG. 3C, the fourth wall member 112d is at least taller than the second wall member 112b, which allows for the formation of the storage space (e.g., interior storage compartment 150, as shown in FIG. 3F) above the shelter area (e.g., interior residence compartment 160), and the resulting angular pitch of the roof member 114 when attached allows for runoff of water, snow, and/or or other items.

Figure 3D:
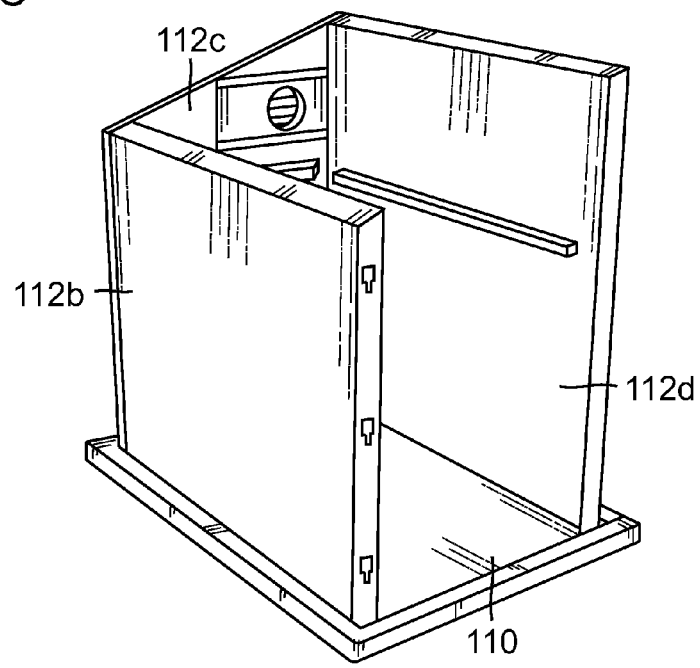

FIG. 3D shows one embodiment of assembling the animal shelter 100 by coupling the third wall member 112c to the base member 110 and the second and fourth wall members 112b, 112d. In one aspect, the third wall member 112c is joined to the base member 110 via the recessed channel 300 and, in some instances, the recessed aperture 310. The third wall member 112c is joined to the second and fourth wall members 112b, 112d via the wall joining components 120.

As described in greater detail herein in reference to FIGS. 4A to 4C, at least two of the wall members 112 (e.g., the first and third wall members 112a, 112c) may comprise one or more coupling members 432 having head features 436 that communicate with a narrowed region 434 of the recessed coupling features 430 of the second and fourth wall members 112b, 112d for secure coupling thereto. In one aspect, the assembly of the coupling members 430, 432 allows for convenient assembly, installation, and a reliable structural rigidity.

Figure 3E:
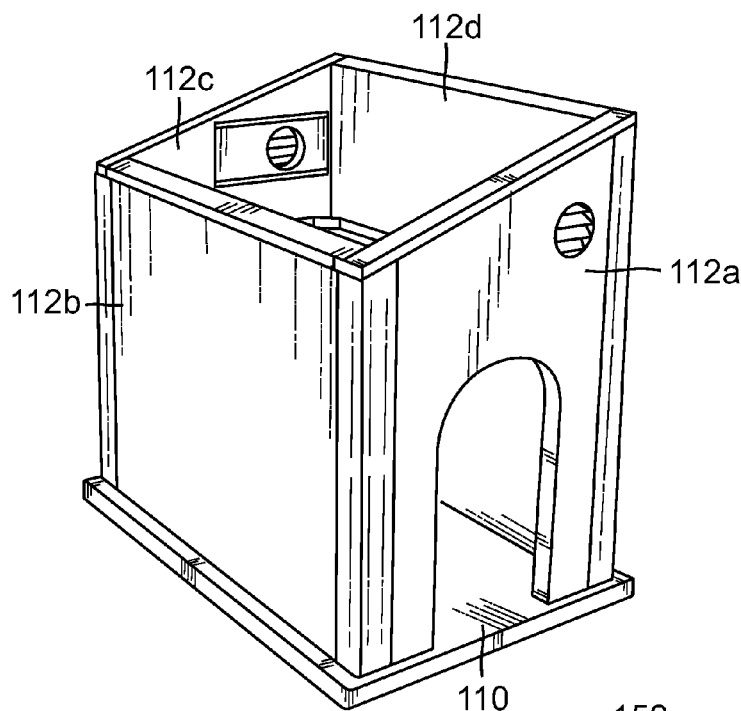
Figure 3F:
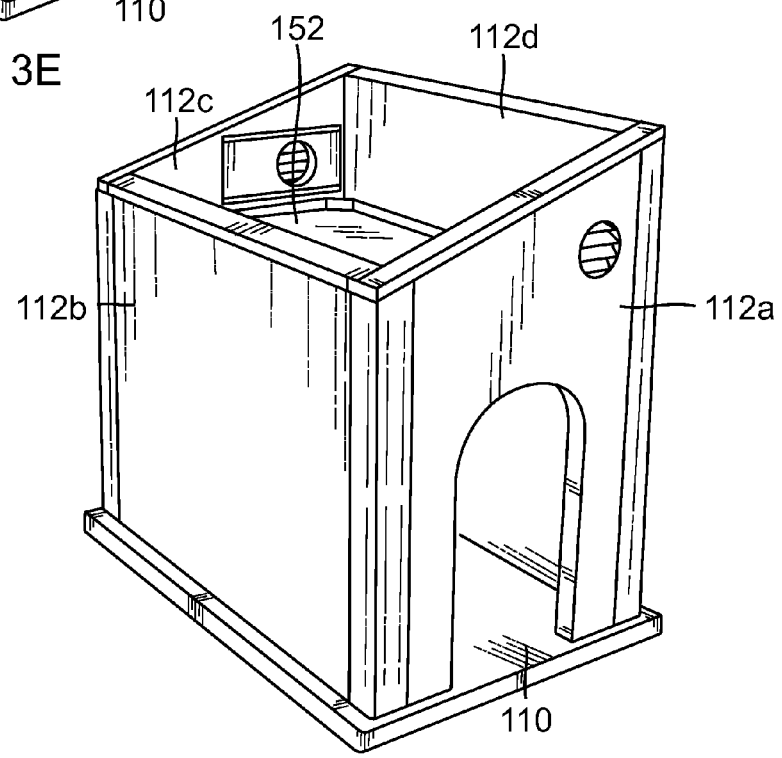

FIG. 3E shows one embodiment of assembling the animal shelter 100 by coupling the first wall member 112a to the base member 110 and the second and fourth wall members 112b, 112d. In one aspect, the first wall member 112a is joined to the base member 110 via the recessed channel 300 and in some instances, the recessed aperture 310. The first wall member 112a is joined to the second and fourth wall members 112b, 112d via the wall joining components 120.

In various implementations, referring to FIG. 3E, the wall members 112a, 112b, 112c, 112d are modularly interchangeable in the base member 110 so that the animal shelter 100 may be configured for a left or right sidewall opening orientation of the access aperture 132. In one aspect, the access aperture 132 is contoured as an arch in the first and/or third wall members 112a, 112c in a symmetrical manner so that various configurations of the animal shelter 110 may be achieved. In various other aspects, it should be appreciated that the access aperture 132 may comprise any types of geometrical contour (e.g., rectangular, circular, triangular, etc.), without departing from the scope of the present disclosure.

In various implementations, referring to FIGS. 3D and 3E and as shown in FIGS. 4A-4C, the wall joining components 120 comprise an L-shaped structure and are securely attached to an exterior surface and both end side surfaces of the first and third wall members 112a, 112c. As shown in FIGS. 4A and 4C, a portion 440 of the wall joining members 120 extend from an interior surface of the first and third wall members 112a, 112c so as to be received by recessed edges 442 of the second and fourth wall members 112b, 112d. Referring to FIG. 4A, the first and third wall members 112a, 112c comprise coupling members 432 that protrude from an interior edge thereof. As shown in FIGS. 4A and 4B, the second and fourth wall members 112b, 112d comprise recessed coupling features 430 on the end side surfaces thereof. Referring to FIGS. 4A and 4B, the coupling members 132 of the first and third wall members 112a, 112c comprise head features 436 that communicate with a narrowed region 434 of the recessed coupling features 430 of the second and fourth wall members 112b, 112d for secure coupling thereto.

In one implementation, during or after coupling the wall members 112a, 112b, 112c, 112d to the base member 110, as shown in FIG. 3E, the removable interior partition wall member 610a, 610b (e.g., training partition member) may be coupled to the base member 110 and/or the second and fourth wall members 112b, 112d to divide or separate the interior space of the animal shelter 100, as shown in FIG. 6A, into a plurality of animal residence compartments 160a, 160b, as previously described herein. In various aspects, it should be appreciated that the interior space of the animal shelter 100 may divided into one, two, or more than two animal residence compartments, without departing from the scope of the present disclosure. In another aspect, it should be appreciated that installing the removable interior partition wall member 610a, 610b may be optional, and as such, the animal shelter 100 may be utilized without installing the removable interior partition wall member 610a, 610b.

In various implementations, either of the first and third wall members 112a, 112c having the access apertures 132 may comprise a smooth rectangular area (not shown) designed as a name placard for an animal using the animal shelter 100. In one aspect, the smooth textured surface allows for markers, stickers, overlay placards, and/or other identification methods to identify an animal using the animal shelter 100.

FIG. 3F shows one embodiment of assembling the animal shelter 100 by positioning and installing the removable interior storage member 152 on the support members 210 of the wall members 112a, 112b, 112c, 112d. As previously described, the interior storage member 152 is substantially flat and rectangular in shape and separates the interior space within the animal shelter 100 into an upper interior region (i.e., interior storage compartment 150) and a lower interior region (i.e., interior residence compartment 160). In one aspect, the removable interior storage member 152 serves as a storage shelf that is adapted to support different types of items for storage. In another aspect, it should be appreciated that installing the removable interior storage member 152 may be optional, and as such, the animal shelter 100 may be utilized without installing the removable interior storage member 152.

Figure 3G:
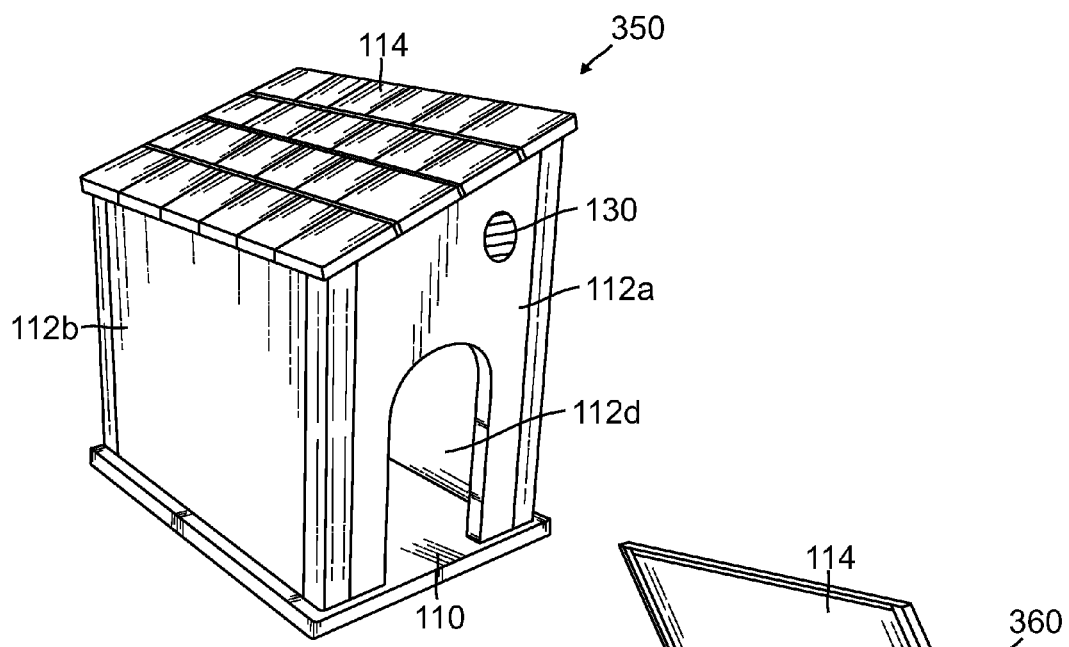
Figure 3H:
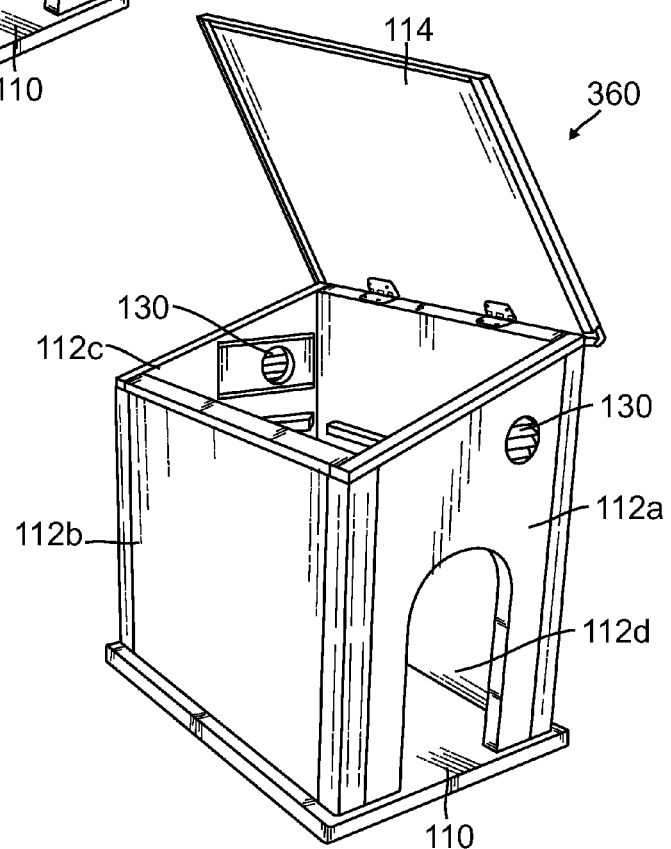

Referring to FIGS. 3G and 3H, in accordance with one or more embodiments of assembling the animal shelter 100, the roof member 114 is joined to at least one wall member 112 (e.g., the fourth wall member 112d) via one or more hinge components 140 (as described in reference to FIG. 1B), which allow the roof member 114 to pivot between an open configuration 350 of FIG. 3G and a closed configuration 360 of FIG. 3H. The roof member 114 is substantially flat and rectangular in shape and is adapted to overlie the upper side edges of the wall members 112a, 112b, 112c, 112d and cover the interior space of the animal shelter 100 defined by the assembly of the base member 110 and the wall members 112a, 112b, 112c, 112d.

The roof member 114, in one embodiment, comprises a perimeter that is adapted to be thicker than a central area thereof. The perimeter of the roof member 114 may be slightly larger in dimensional size than the perimeter formed by the assembled vertical wall members 112. In one aspect, the overhanging of the roof member 114 allows for the storage and shelter area to remain protected from rain, snow, and/or other items. In another aspect, the overhanging of the roof member 114 may be reduced or removed to reduce lift from winds.

In one implementation, the roof member 114 may comprise one or more securing tabs (not shown) on one or more of the underside corners, which may be adapted to couple with one or more securing slots (not shown) in at least one of the wall members 112 (e.g., second wall member 112b) to secure the roof member 114 and the storage area (e.g., interior storage compartment 150). In one aspect, the roof member securing feature allows for added protection against wind or other animals attempting to gain entrance to the storage area of the interior storage compartment 150.

As shown in FIGS. 3G and 3H, one or more of the wall members 112a, 112b, 112c, 112d may comprise at least one venting feature (e.g., vent aperture 130) formed therein to allow for the interior space of the animal shelter 100 to vent heated air in hotter temperatures and retain warmth during colder periods. The vent aperture 130 may also vent any moisture to the exterior during rain and/or snow activity. A sliding door (e.g., movable vent cover 134) may be utilized to regulate the amount of air flow through the one or more vent apertures 130.

FIGS. 4A-4C show various embodiments of the wall joining components 120 of the wall members 112a, 112b, 112c, 112d of the animal shelter 100. In various implementations, the wall joining components 120 comprise an elongated L-shaped structure and are securely attached to an exterior surface and both end side surfaces of the first and third wall members 112a, 112c. As shown in FIG. 4A, a portion 440 of the wall joining members 120 extend from an interior surface of the first and third wall members 112a, 112c so as to be received by recessed edges 442 of the second and fourth wall members 112b, 112d. Referring to FIG. 4A, the first and third wall members 112a, 112c comprise coupling members 432 that protrude from an interior edge thereof. As shown in FIG. 4B, the second and fourth wall members 112b, 112d comprise recessed coupling features 430 on the end side surfaces thereof. Referring to FIGS. 4A and 4B, the coupling members 432 of the first and third wall members 112a, 112c comprise head features 436 that communicate with a narrowed region 434 of the recessed coupling features 430 of the second and fourth wall members 112b, 112d for secure coupling thereto. In various aspects, the coupling members 432 and head features 436 may be formed in the shape of an L-shaped structure or a T-shaped structure, without departing from the scope of the present disclosure.

FIG. 4D shows one embodiment of the second wall member 112b comprising one or more support protrusions 450 that extend from a lower side of the second wall member 112b for coupling with the recessed apertures 310 of the base member 110. In various implementations, one or more the wall members 112a, 112b, 112c, 112d may comprise one or more support protrusions 450 extending from a lower side thereof for coupling with the recessed apertures 310 of the base member 110. The recessed channels 300 of the base member 110 are adapted to receive the wall members 112a, 112b, 112c, 112d via, for example, a pressed fit. Similarly, the recessed apertures 310 comprise a contoured dimension adapted to receive the contoured shape of the support protrusions 450 via, for example, a pressed fit. In one aspect, during assembly, the wall members 112a, 112b, 112c, 112d may be simultaneously pressed into the recessed channels 300 and the recessed apertures 310 for secure coupling to the base member 110.

FIGS. 5A and 5B show various embodiments of the removable interior storage member 152 of the animal shelter 100. In one implementation, the interior storage member 152 is substantially flat and rectangular in shape with chamfered corners 520. In one aspect, the chamfered corners 520 allow for venting between the shelter area (e.g., interior residence compartment 160) and the storage area (e.g., interior storage compartment 150).

In one embodiment, the interior storage member 152 may comprise the raised ridge 530 around the perimeter edge thereof. The raised ridge 530 may comprise various cross-sectional shapes, such as rectangular, semi-circular, triangular, trapezoidal, or various other types of geometrical shapes. In one aspect, the raised ridge 530 provides a vertical stop that encircles the perimeter of the removable interior storage member 152 to inhibit spillage of liquids and other items into the interior space (i.e., interior residence compartment 160) provided below.

In various implementations, the removable interior storage member 152 separates the interior space within the animal shelter 100 into an upper interior region and a lower interior region. The upper interior region comprises the interior storage compartment 150 that may be utilized as a storage space, and the removable interior storage member 152 serves as a storage shelf that is adapted to support different types of items for storage, such as animal food, animal cleaning materials, and various other types of animal care items.

FIG. 6A shows one embodiment of the removable and/or incrementally adjustable interior partition wall member 610a (e.g., a training partition member) of the animal shelter 100. In one implementation, the partition wall member 610a may be attached to the base member 110 and/or the wall members 112 so as to divide the interior space (i.e., interior residence compartment 160) into multiple interior residence compartments or at least reduce the dimensional size of the interior space within the animal shelter 100. In another implementation, the partition wall member 610a is removable from the interior region of the animal shelter 100 so as to increase the dimensional size of the interior space within the animal shelter 100.

In various implementations, the partition wall member 610a may be incrementally moved along the length of the base member 110 between a plurality of partition receiving holes 320, as shown in FIG. 3A, so as to incrementally lengthen or shorten the dimensional size of the interior space within the animal shelter 100 to thereby accommodate various sizes of animals. As such, in accordance with various aspects of the present disclosure, the incrementally adjustable interior partition wall member 610a may be utilized to crate train an animal (i.e., at least assist with crate training an animal) within the animal shelter 100 as the animal grows from youth to adulthood.

In another embodiment, as shown in FIG. 6B, the interior partition wall member 610b may comprise a grate or mesh type structure 650 that serves as a training partition. The grate or mesh type structure 650 may comprise one or more protruding members 652, 654 that extend from the grate or mesh type structure 650 to allow the interior partition wall member 610b to be coupled to and removed from the animal shelter 100. One or more first protruding members 652 are adapted to couple with the partition receiving holes formed in a portion of removable interior storage member 152, and one or more second protruding members 654 are adapted to couple with partition receiving holes 320 formed in a portion of the base member 110, as shown in FIG. 3A. In one aspect, the grate or mesh type structure 650 of the interior partition wall member 610b serves as a training partition to assist with crate training an animal residing in the animal shelter 100.

Figure 7A:
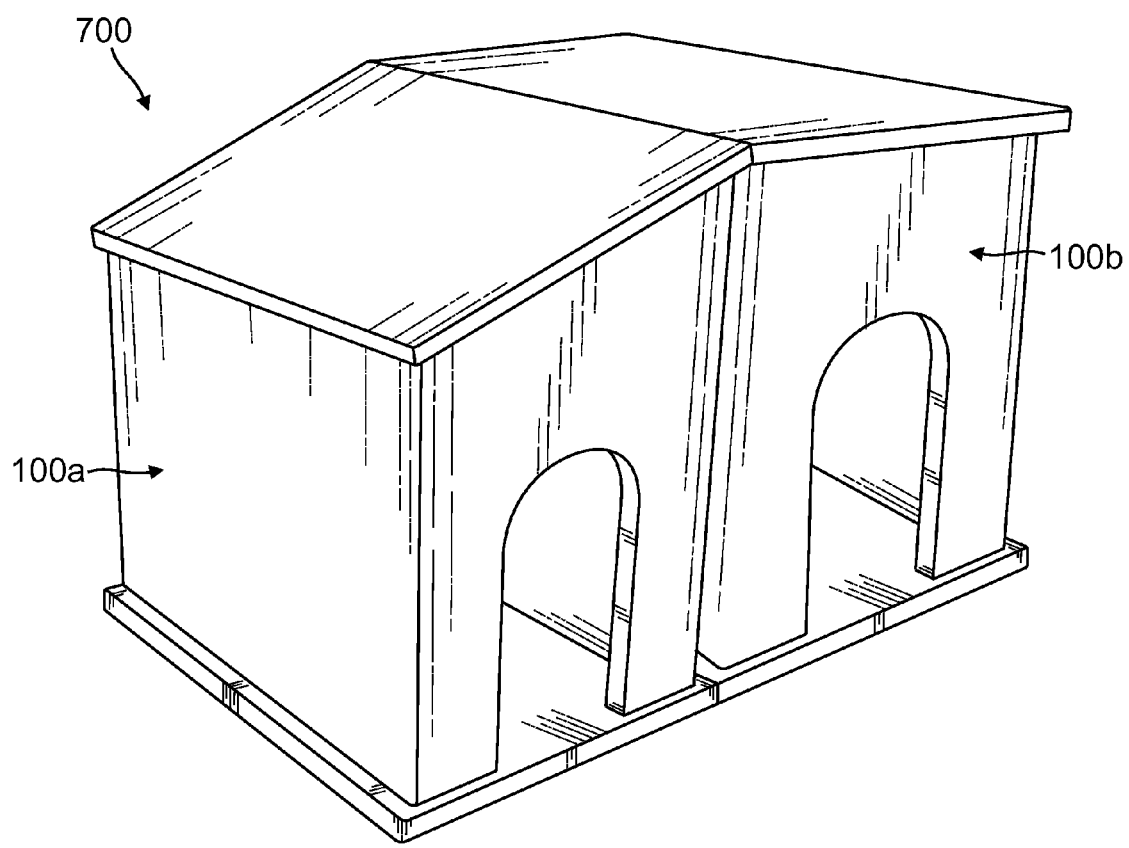
FIGS. 7A-7B show perspective views of various multi-unit configurations for the animal shelter 100 of FIG. 1A, in accordance with one or more embodiments of the present disclosure.
Figure 7B:
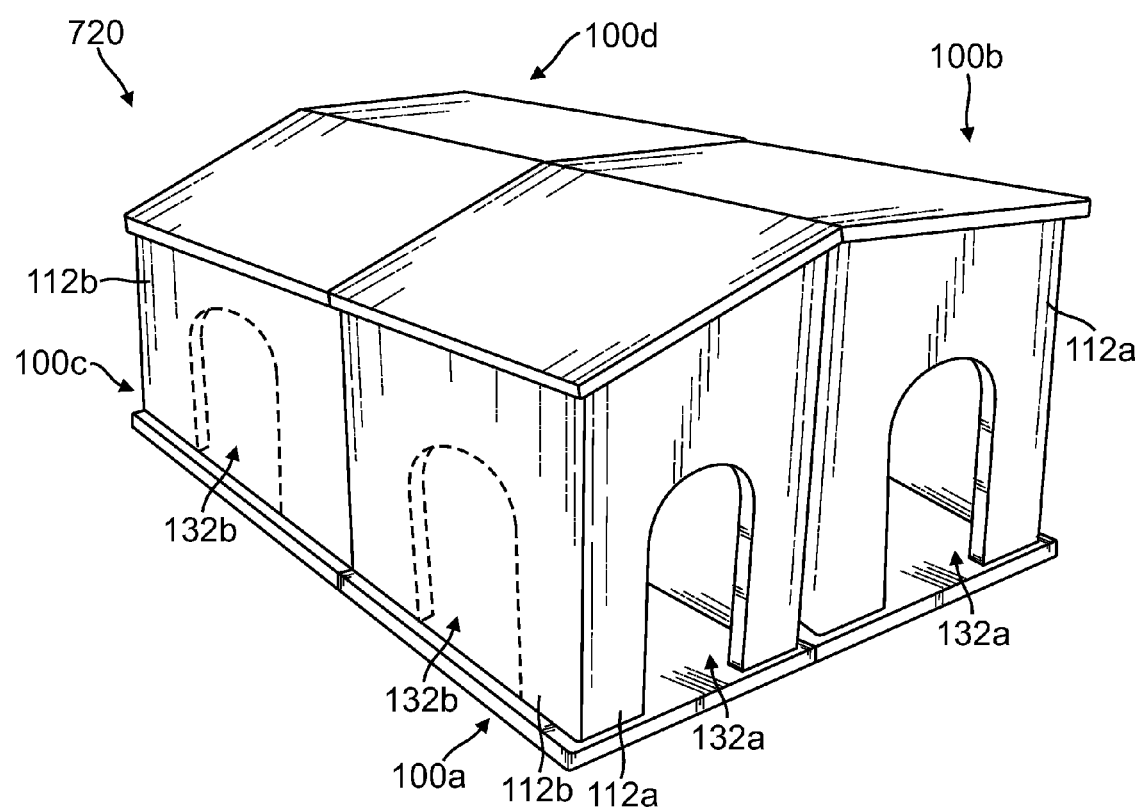

FIGS. 7A and 7B show perspective views of various multi-unit configurations 700, 720, respectively, for the animal shelter 100, in accordance with one or more embodiments of the present disclosure. In one embodiment, as shown in FIG. 7A, a first multi-unit configuration comprises at least two animal shelter assemblies 100a, 100b that are coupled together to form a duplex structure having at least two separate interior storage compartments and at least two separate interior residential compartments. In another embodiment, as shown in FIG. 7B, a second multi-unit configuration comprises at least four animal shelter assemblies 100a, 100b, 100c, 100d that are coupled together to form a quadplex structure having at least four separate interior storage compartments and at least four separate interior residential compartments. In various other implementations, it should be appreciated that various other multi-unit configurations may comprise any number of animal shelter assemblies 100, without departing from the scope of the present disclosure.

In one embodiment, as shown in FIG. 7B, each of the animal shelter assemblies 100a, 100b may comprise at least one access aperture 132a formed in the first wall member 112a (e.g., front sidewall) thereof. In reference to FIGS. 1A and 1B, each of the other animal shelter assemblies 100c, 100d may comprise at least one access aperture 132a formed in the third wall member 112c (e.g., rear sidewall) thereof.

In another embodiment, as shown in FIG. 7B, each of the animal shelter assemblies 100a, 100b, 100c, 100d may comprise an alternate access aperture 132b (as shown with dashed lines) formed in the second wall member 112b (e.g., shorter rectangular sidewall) thereof. In various implementations, this configuration allows any number of animal shelter assemblies 100 to be abutted end-to-end and/or back-to-back to form a row for improved efficiency and space saving in, for example, an animal care facility.

The one or more embodiments presented herein illustrate but do not limit the present disclosure. Therefore, it should be understood that numerous modifications and variations are possible in accordance with the principles of the present disclosure. Accordingly, the scope of the present disclosure is defined only by the following claims.

What is claimed is:

1. A shelter for an animal, the shelter comprising:
    a base member having a plurality of recessed channels formed in an upper surface thereof and adjacent to a perimeter thereof, the base member including a plurality of partition receiving holes incrementally spaced along a length of the base member in a central region between the recessed channels;
    a plurality of wall members coupled with the recessed channels in the base so as to form an enclosure that defines an interior space;
    a roof member pivotally attached to at least one of the wall members so as to move between an open and closed configuration;
    a removable storage member positioned between the base member and the roof member so as to vertically separate the interior space into an interior storage compartment proximate to the roof and an underlying interior residential compartment for the animal; and
    a movable partition member positioned between at least two of the wall members, wherein an edge of the movable partition member includes a plurality of protruding members adapted to insert into selected ones of the partition receiving holes such that the movable partition member is moveable according to partition receiving hole selection to incrementally vary the dimension of the interior residential compartment.

2. The shelter of claim 1, wherein each of the wall members are coupled to the base member in a perpendicular manner, and wherein the plurality of wall members are coupled to each other to form a rectangular enclosure that defines the interior space with the base member comprising a floor.

3. The shelter of claim 1, wherein at least one of the wall members comprises an access aperture formed therein to provide access to the interior space, and wherein the assembly further comprises a removable door adapted to couple to the access aperture so as to inhibit access to the interior space.

4. The shelter of claim 3, wherein the base member further comprises one or more first door receiving holes recessed in the upper surface thereof, and wherein the access aperture comprises one or more second door receiving holes formed in an upper portion thereof, and wherein the removable door comprises one or more first coupling rods adapted to couple with the corresponding one or more first door receiving holes and one or more second coupling rods adapted to couple with the corresponding one or more second door receiving holes.

5. The shelter of claim 3, wherein the removable door comprises a first panel, a second panel, and a recessed channel formed between the first panel and the second panel, and wherein the recessed channel is adapted to couple the removable door to the access aperture.

6. The shelter of claim 1, wherein the roof member is joined to at least one wall member via one or more hinge components that allow the roof member to pivot away from the wall members into the open configuration, and wherein the shelter further comprises a retaining member adapted to hold the roof member in the open configuration by interposing the retaining member between at least one wall member and the roof member.

7. The shelter of claim 1, wherein one or more of the wall members comprise a vent aperture formed therein so as to allow air circulation in and out of the interior space, and wherein the assembly further comprises a sliding cover adapted to cover at least a portion of the vent aperture to inhibit air circulation in and out of the interior space.

8. The shelter of claim 1, wherein at least two of the wall members comprise an elongated, vertical wall joining member, and wherein at least two other wall members comprise a recessed edge adapted to receive the wall joining member so as to form a perpendicular corner.

9. The shelter of claim 1, wherein at least two of the wall members comprise one or more coupling members that protrude from an interior edge thereof, and wherein at least two other wall members comprise one or more recessed coupling features on end side surfaces thereof, and wherein at least one of the coupling members comprise a head feature that communicates with a narrowed region of at least one of the recessed coupling features so as to hook securely to the narrowed region when the wall member is insertably coupled with at least one of the recessed channels of the base member.

10. The shelter of claim 1, wherein the base member comprises one or more recessed apertures formed in the recessed channels, and wherein one or more of the wall members comprise one or more support protrusions that extend from a lower side for coupling with the recessed apertures of the base member, and wherein a portion of each of the wall members is insertably coupled with at least one of the recessed channels of the base member, and wherein the support protrusions of each wall member are insertably coupled with the recessed apertures of the base member.

11. The shelter of claim 1, wherein each of the wall members comprise a support ridge member attached thereto and positioned between the removable storage member and the base member so as to receive and support the removable storage member.

12. The shelter of claim 1, wherein the removable storage member comprises a substantially flat and rectangular shape with chamfered corners so as to allow for air circulation between the interior storage compartment and the interior residential compartment, and wherein the removable storage member comprises a raised ridge around the perimeter edge thereof so as to provide a vertical stop that encircles the perimeter of the removable storage member.

13. The shelter of claim 1, wherein the base member, the wall members, and the roof member is formed of material comprising at least one of plastic, resin, metal, wood, glass, and Plexiglas, and wherein the material inhibits Ultra-Violet (UV) deterioration.

14. The shelter of claim 1, wherein the shelter is adapted to be joined with a plurality of other shelters to form a multiplex configuration having a plurality of separate interior storage compartments and a plurality of separate interior residential compartments.

15. A method for assembling a shelter for an animal, the method comprising:
    providing a moveable partition having an edge with one or more protruding members;
    providing a base member having a plurality of recessed channels formed in an upper surface thereof and adjacent to a perimeter thereof and a plurality of partition receiving holes incrementally spaced along a length thereof in a central region between the recessed channels;

coupling a plurality of wall members with the recessed channels in the base member so as to form an enclosure that defines an interior space;

pivotally attaching a roof member to at least one of the wall members so as to be movable between an open and closed configuration;

positioning a removable storage member between the base member and the roof member so as to vertically separate the interior space into an interior storage compartment proximate to the roof member and an underlying interior residential compartment for the animal;

and positioning the movable partition member between at least two of the wall members by inserting the one or more protruding members of the moveable partition member into selected ones of the partition receiving holes so as to vary the dimension of the interior residential compartment.

16. The method of claim 15, wherein coupling the wall members with the base member comprises coupling the wall members to the base member in a perpendicular manner, and wherein coupling the wall members to the base member comprises coupling the wall members to each other to form a rectangular enclosure that defines the interior space with the base member comprising a floor.

17. The method of claim 15, further comprising forming an access aperture in at least one of the wall members to provide access to the interior space, and further comprising coupling a removable door to the access aperture so as to inhibit access to the interior space.

18. The method of claim 15, wherein pivotally attaching the roof member comprises joining the roof member to at least one wall member via one or more hinge components that allow the roof member to pivot away from the wall members into the open configuration.

19. A system for sheltering a plurality of animals, the system comprising a plurality of shelters coupled together to form a multi-unit configuration, wherein each shelter comprises:

a base member having a plurality of recessed channels formed in an upper surface thereof and adjacent to a perimeter thereof and including a plurality of partition receiving holes incrementally spaced along a length of the base member in a central region between the recessed channels;

a plurality of wall members coupled with the recessed channels in the base member so as to form an enclosure that defines an interior space;

a roof member pivotally attached to at least one of the wall members so as to move between an open and closed configuration;

a removable storage member positioned between the base member and the roof member so as to vertically separate the interior space into an interior storage compartment and an interior residential compartment for the animal;

and a movable partition member positioned between at least two of the wall members and adapted to vary the dimension of the interior residential compartment, wherein an edge of the movable partition member includes a plurality of protruding members adapted to insert into selected ones of the partition receiving holes such that the movable partition member is moveable according to the hole selection to incrementally vary the dimension of the interior residential compartment.

20. The system of claim 19, wherein the plurality of shelters are coupled together to have a plurality of separate interior storage compartments and a plurality of separate interior residential compartments with each accessible via an access aperture.

* * * * *